United States Patent
Zhang et al.

(10) Patent No.: US 8,687,652 B2
(45) Date of Patent: Apr. 1, 2014

(54) UPLINK ACK/NAK RESOURCE ALLOCATION

(75) Inventors: Xiaoxia Zhang, San Diego, CA (US); Juan Montojo, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 759 days.

(21) Appl. No.: 12/402,399

(22) Filed: Mar. 11, 2009

(65) Prior Publication Data

US 2009/0247174 A1 Oct. 1, 2009

Related U.S. Application Data

(60) Provisional application No. 61/039,994, filed on Mar. 27, 2008.

(51) Int. Cl.
*H04J 3/16* (2006.01)

(52) U.S. Cl.
USPC .......... 370/468; 370/329; 370/384; 714/749

(58) Field of Classification Search
CPC .......... H04J 3/12; H04J 3/1682; H04L 1/18; H04W 72/0406
USPC ......... 370/328, 329, 203, 208, 209, 210, 337, 370/335, 468, 395.21, 445, 384, 430; 455/452, 452.1, 452.2, 101; 714/48, 714/746–749, 451
See application file for complete search history.

(56) References Cited

U.S. PATENT DOCUMENTS

| 7,912,135 | B2 * | 3/2011 | Kwak et al. | 375/260 |
|---|---|---|---|---|
| 8,054,786 | B2 * | 11/2011 | Wu et al. | 370/329 |
| 8,107,426 | B2 * | 1/2012 | Cho et al. | 370/329 |
| 2006/0205414 | A1 | 9/2006 | Teague | |
| 2007/0070908 | A1 | 3/2007 | Ghosh et al. | |
| 2007/0097981 | A1 | 5/2007 | Papasakellariou | |
| 2007/0149131 | A1 | 6/2007 | Li et al. | |

(Continued)

FOREIGN PATENT DOCUMENTS

| CN | 101127584 A | 2/2008 |
|---|---|---|
| EP | 1746855 A2 | 1/2007 |
| WO | WO2008020738 A1 | 2/2008 |

OTHER PUBLICATIONS

Huawei: "Relation between UL ACK/NACK and DL CCE" SRD Generation Partnership Project, Mobile Competence Centre, vol. RAN WGI, No. RI-074063, Oct. 2, 2007, XP050107604 650, Route Des Lucioles ; F-06921 Sophia-Antipolis Cedex ; France [retrieved on Oct. 2, 2007] sections 1, 2, 3, 3.1, 4.

(Continued)

*Primary Examiner* — Hanh N Nguyen
(74) *Attorney, Agent, or Firm* — Dalei Dong

(57) ABSTRACT

Systems and methodologies are described that facilitate allocating uplink resources to mobile devices to employ to signal acknowledgment indicators. Persistently scheduled mobile devices can be explicitly assigned uplink resources. Dynamically scheduled mobile device can utilize a one-to-one mapping to identify uplink resources based upon a downlink control channel index. The one-to-one mapping can be revised to remove associations between downlink control channel indices and resources allocated to persistently scheduled users and/or reserved for other control signaling in a mixed resource block. In addition, downlink control channel indices can be selected to avoid collisions between dynamic and persistent users.

10 Claims, 11 Drawing Sheets

(56) References Cited

U.S. PATENT DOCUMENTS

| | | |
|---|---|---|
| 2007/0149132 A1 | 6/2007 | Li et al. |
| 2007/0171849 A1 | 7/2007 | Zhang et al. |
| 2008/0008206 A1* | 1/2008 | Cho et al. .................. 370/430 |
| 2010/0069081 A1* | 3/2010 | Mitra et al. ............... 455/452.2 |

OTHER PUBLICATIONS

International Search Report & Written Opinion—PCT/US2009/038438, International Search Authority—European Patent Office—May 26, 2010.

Nokia Siemens Networks: "NAS States, Persistent Scheduling, C-RNTI Allocation at Handover" SRD Generation Partnership Project, Mobile Competence Centre, vol. RAN WG2, No. R2-081372 Stage 2 Update, Feb. 22, 2008, XP050139100 650, Route Des Lucioles ; F-06921 Sophia-Antipolis Cedex ; France [retrieved on Feb. 22, 2008] sections 5.1.3, 5.2.3, 5.3, 11.1.

Partial Search Report—PCT/US2009/038438—International Search Authority—European Patent Office, Apr. 9, 2010.

Taiwan Search Report—TW098110243—TIPO—Jul. 26, 2012.

\* cited by examiner

UPLINK ACK/NAK RESOURCE ALLOCATION

CROSS-REFERENCE TO RELATED APPLICATIONS

This application claims the benefit of U.S. Provisional Patent application Ser. No. 61/039,994 entitled "UPLINK ACK/NAK RESOURCE ALLOCATION" which was filed Mar. 27, 2008. The entirety of the aforementioned application is herein incorporated by reference.

BACKGROUND

I. Field

The following description relates generally to wireless communications, and more particularly to enabling implicit one-to-one mapping between downlink virtual resource block indices to uplink acknowledgment locations for mixed uplink physical resource blocks.

II. Background

Wireless communication systems are widely deployed to provide various types of communication content such as voice and data. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method for facilitating allocation of acknowledgement resources is described herein. The method can comprise utilizing a mapping to identify an uplink resource location corresponding to a downlink control channel index. The method can also include evaluating the uplink resource location to ascertain validity. In addition, the method can comprise updating the mapping when the uplink resource location is an invalid location.

A second aspect described herein relates to an apparatus. The apparatus can comprise an identification module that selects an uplink resource location to employ to signal an acknowledgement indicator, wherein the uplink resource location is selected based at least in part on an association to a downlink control channel index. The apparatus can also include a validation module that verifies whether the selected uplink resource location is a valid acknowledgement resource. The apparatus can further comprise an update module that generates a new association between the downlink control channel index and a disparate uplink resource location when the selected uplink resource location corresponds to an invalid resource location.

A third aspect relates to a wireless communications apparatus that facilitates implicit resource allocation. The wireless communications apparatus can comprise means for employing a one-to-one mapping between downlink indices to uplink resources to select an uplink resource location corresponding to a downlink control channel index. The wireless communications apparatus can also include means for identifying the selected uplink resource location as at least one of a valid resource location or an invalid resource location. In addition, the wireless communications apparatus can comprise means for redefining the one-to-one mapping to remove associations between downlink control channel indices and invalid resource locations.

A fourth aspect described herein relates to a computer program product, which can comprise a computer-readable medium that comprises code for causing at least one computer to employ a one-to-one mapping to identify a candidate acknowledgement resource on an uplink channel corresponding to a physical downlink control channel (PDCCH) index on which scheduling information is obtained. The computer-readable medium can further include code for causing the at least one computer to evaluate the candidate acknowledgement resource to ascertain validity. In addition, the computer-readable medium can comprise code for causing the at least one computer to redefine the one-to-one mapping to remove the candidate acknowledgement resource when invalid.

A fifth aspect relates to a wireless communications apparatus comprising a processor configured to utilize a one-to-one mapping between physical downlink control channel (PDCCH) indices and physical uplink control channel (PUCCH) resources to select a candidate acknowledgement resource corresponding to a particular PDCCH index. The processor can be further configured to indicate the candidate acknowledgement resource as one of a valid resource or an invalid resource. In addition, the processor can be configured to revise the one-to-one mapping to remove associations between PDCCH indices and invalid resources.

According to another aspect, a method for allocating uplink acknowledgement resources is described herein. The method can comprise partitioning a set of total available acknowledgment resources into a first subset and a second subset. The method can also include assigning resources from the first subset to a persistently scheduled mobile device. In addition, the method can comprise allocating a downlink control channel index to a dynamically scheduled mobile device that implicitly maps to a resource in the second subset.

Yet another aspect relates to an apparatus comprising a memory that retains instructions related to partitioning a set of total available acknowledgment resources into a first subset and a second subset, assigning resources from the first subset to a persistently scheduled mobile device, and allocating a downlink control channel index to a dynamically scheduled mobile device that implicitly maps to a resource in the second subset. The apparatus can also comprise a processor, coupled to the memory, configured to execute instructions retained in the memory.

Still another aspect relates to a wireless communications apparatus that facilitates allocating uplink resources. The wireless communications apparatus can comprise means for partitioning a set of total available acknowledgment resources into a first subset and a second subset. The wireless communications apparatus can further include means for assigning resources from the first subset to a persistently scheduled mobile device. In addition, the wireless communications apparatus can comprise means for allocating a downlink control channel index to a dynamically scheduled mobile device that implicitly maps to a resource in the second subset.

An additional aspect described herein relates to a computer program product, which can comprise a computer-readable medium. The computer readable medium can comprise code for causing at least one computer to partition a set of total available acknowledgment resources into a first subset and a second subset. The computer-readable medium can also include code for causing the at least one computer to assign resources from the first subset to a persistently scheduled mobile device. In addition, the computer-readable medium can comprise code for causing the at least one computer to allocate a downlink control channel index to a dynamically scheduled mobile device that implicitly maps to a resource in the second subset.

A further aspect describe herein relates to a wireless communications apparatus comprising a processor configured to partition a set of total available acknowledgment resources into a first subset and a second subset; assign resources from the first subset to a persistently scheduled mobile device; allocate a downlink control channel index to a dynamically scheduled mobile device that implicitly maps to a resource in the second subset; and signal the dynamically scheduled mobile device that the first subset include resources assigned to persistently-scheduled mobile devices.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
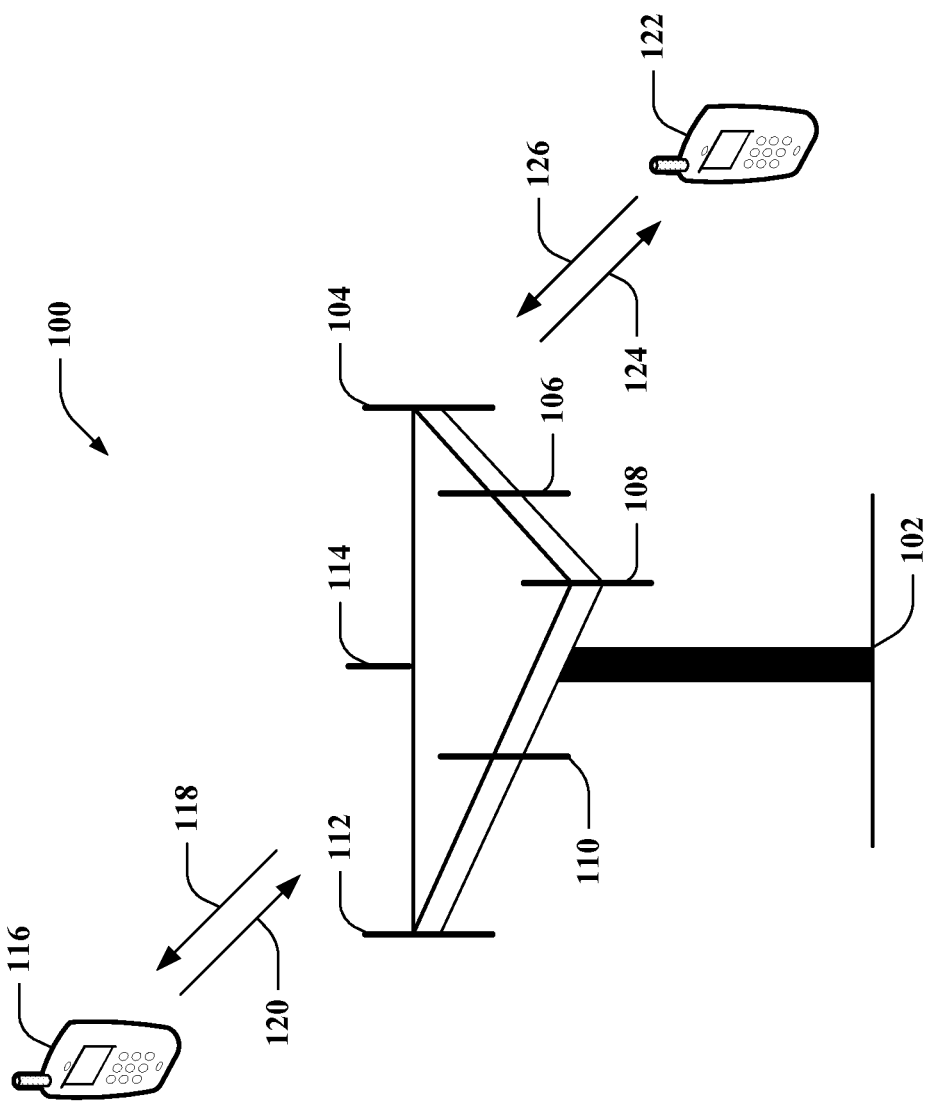
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to computer-related entities such as: hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band as can forward link 124 and reverse link 126.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example. Further, system 100 can utilize substantially any type of duplexing technique to divide communication channels (e.g., forward link, reverse link, . . . ) such as FDD, TDD, and the like.

According to another example, system 100 can be a multiple-input multiple-output (MIMO) communication system. MIMO systems can employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and receive antennas are utilized.

In an aspect, mobile devices 116 and 122 can transmit acknowledgment indicators to base station 102. Acknowledgement indicators enable mobile devices 116 and 122 to signal receipt of a downlink transmission or packet from base station 102. For instance, mobile devices 116 and 122 can transmit an acknowledgement (ACK) to base station 102 when a downlink transmission is successfully received and decoded. In addition, mobile devices 116 and 122 can signal a non-acknowledgement (NAK) when a downlink transmission or packet is not successfully received or decoded. According to an aspect, mobile devices 116 and 122 can utilize resources or location on an uplink channel to indicate ACK or NAK. The location can be selected based upon downlink allocations. For example, mobile device 116 can transmit an acknowledgment message to base station 102 at a location (e.g., resource location in time, frequency, code, etc.) of uplink 120 based upon characteristics of resources on downlink 118 allocated for mobile device 116.

In accordance with one aspect, a one-to-one implicit mapping can be generated between an index of a downlink channel and a resource location in an uplink channel for acknowledgement. Dynamically scheduled mobile devices can employ the one-to-one mapping to identify acknowledgement locations. A dynamically scheduled mobile device obtains scheduling information every transmission time interval (TTI). To acknowledge a particular downlink transmission, a mobile device can utilize an uplink resource location mapped to a downlink control channel index (e.g., index of a control channel element associated with the mobile device) employed to convey scheduling information to the mobile device for the particular downlink transmission.

In an aspect, uplink control information can include channel quality indicators in addition to acknowledgement indicators. In such situations, resource locations otherwise available for acknowledgements are utilized for channel quality indicators. The one-to-one mapping can be updated to reflect resources employed by channel quality indicators. For example, utilizing the one-to-one mapping, a resource location can be identified based upon a downlink control channel index. The resource location can be evaluated for validity. A valid resource location is a location available for acknowledgements. An invalid resource location is a location assigned for channel quality indicators. The one-to-one mapping can be updated when a downlink control channel index maps to an invalid resource. The mapping can be redefined to associate the downlink control channel index with a valid resource location.

In another aspect, a mobile device can be semi-persistently scheduled. A semi-persistently scheduled mobile device obtains scheduling information (e.g., resource assignments) that remains valid for more than one TTI. Accordingly, a downlink transmission to a semi-persistently scheduled mobile device is accompanied by a corresponding downlink control channel transmission when a semi-persistent assignment is first issued. A semi-persistently scheduled mobile device can signal acknowledgement indicators corresponding to downlink transmission utilizing resources specified in the scheduling information that establishes the semi-persistent grant.

According to example, mobile device 116 can be dynamically scheduled by base station 102 and mobile device 122 can be semi-persistently scheduled by base station 102. To acknowledge (or negatively acknowledge) a downlink transmission from base station 102, mobile device 116 utilizes implicitly mapped uplink resources and mobile device 122 employs resources explicitly specified in scheduling information. Acknowledgement indicators from mobile device 116 (dynamically scheduled) and mobile device 122 (persistently scheduled) can be multiplexed according to a variety of mechanisms. For instance, base station 102 can schedule mobile devices 116 and 122 to avoid collisions. Mobile device 116 can continue to employ an implicit one-to-one mapping, and mobile device 112 can continue to utilize assigned uplink resources. Base station 102 can ensure that downlink indices that map to resources explicitly assigned to mobile device 122 are not utilized to signal dynamic scheduling information to mobile device 116. In another example, mobile devices 116 and 122 can coordinate to avoid collisions. A set of total available resources of acknowledgement indicators can be partitioned into two subsets. One subset can be associated with dynamically scheduled mobile devices (e.g., implicitly assigned resources) and one subset can be associated with persistently scheduled mobile devices. Mobile device 122 can employ resources in subset associated with persistently scheduled users. Mobile device 116 can utilize an implicit one-to-one mapping as discussed supra. In addition, mobile device 116 can prune the mapping to avoid invalid resource locations (e.g., locations assigned for channel quality indicators). Moreover, mobile device 116 can further update the mapping to avoid mappings to resource locations within the subset designated for persistent users.

Figure 2:
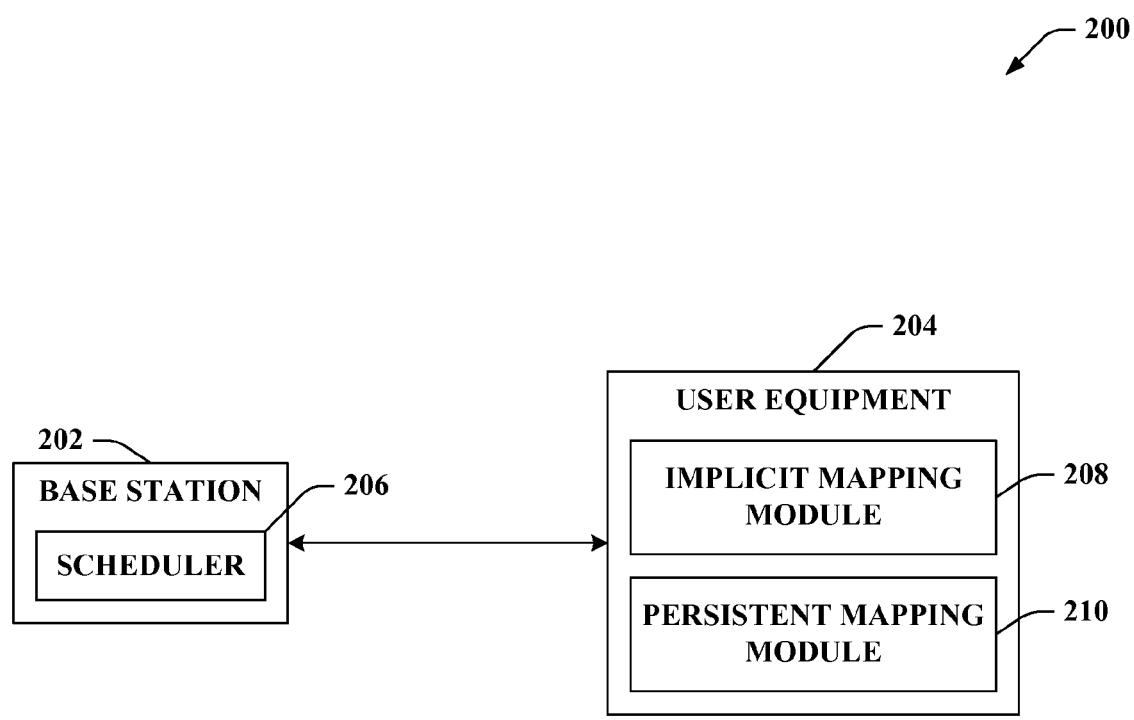
FIG. 2 is an illustration of an example system that facilitates allocation of acknowledgement resources in mixed resource blocks.

Turning to FIG. 2, illustrated is a wireless communications system 200 that facilitates uplink resource allocation for acknowledgement indicators. The system 200 includes a base station 202 that can communication with user equipment (UE) 204 (and/or any number of disparate devices (not shown)). Base station 202 can transmit information to UE 204 over a forward link channel or downlink channel. Further, base station 202 can receive information from UE 204 over a reverse link or uplink channel. Moreover, system 200 can be a MIMO system. Additionally, system 200 can operate in an OFDMA wireless network (such as 3GPP, 3GPP2, LTE, etc., for example). It is to be appreciated that base station 202 can be substantially similar to and perform similar functions as base station 102 described above with reference to FIG. 1. Further, UE 204 can provide similar functionality as mobile device 116 and 122 also described in regard to FIG. 1.

Base station 202 includes a scheduler 206 that effectuates uplink and/or downlink scheduling of one or more mobile devices, such as UE 204. On the downlink, the scheduler 206 allocates data to UE 204 in terms of resource blocks. In LTE-based systems, for example, a resource block includes twelve subcarriers in the frequency domain and one slot (e.g., six or seven OFDM symbols) in the time domain. A resource element or resource location is a tuple that includes a frequency index (e.g., sub-carrier index) and a symbol index. On the downlink, an allocated resource block can include downlink control information and user data. Downlink control information can be signaled on a physical downlink control channel (PDCCH) and user data on a physical downlink shared channel (PDSCH). Downlink control information can include, for example, scheduling information as discussed above. According to an aspect, scheduling information on PDCCH associated with UE 204 can be signaled on resources included in a resource block allocated to UE 204. PDCCH can be characterized according to control channel elements (CCE) (e.g., groups of resource elements) wherein one or more CCEs can be employed to convey downlink channel information to UE 204.

According to an aspect, scheduler 206 can dynamically schedule UE 204. UE 204, when dynamically scheduled, obtains scheduling information each transmission time interval (TTI). For example, in LTE based systems, UE 204 can receive scheduling information every 1 ms (e.g., each sub-frame). Accordingly, UE 204 receives downlink sub-frames that include PDSCH (e.g., user data) and PDCCH (e.g., downlink control information). In an aspect, UE 204 receives user data (e.g., PDSCH) on the downlink. UE 204 signals an acknowledgment indicator (e.g, ACK or NAK) to base station 202 to inform whether or not the user data is successfully received and decoded. For example, UE 204 employs a physical uplink control channel (PUCCH) to signal the acknowledgement indicator. In addition, it is to be appreciated that UE 204 can utilize a physical uplink shared channel (PUSCH) for acknowledgement indicators. For instance, UE 204 can multiplex the acknowledgment indicator with user data transmitted on the uplink.

In an aspect, UE 204 includes an implicit mapping module 208 that employs a one-to-one mapping to identify a resource location of PUCCH to utilize for the acknowledgement indicator. The one-to-one mapping associates a PDCCH index with an acknowledgement resource location. For example, the resource location can be presented in terms of an uplink resource block index, a time varying cyclic shift, and an orthogonal cover. In addition, the PDCCH index can be denoted by an index of a first CCE utilized to construct PDCCH for a particular user. For example, the PDCCH index for a particular mobile device can be one if the index of the first CCE employed to construct the PDDCH for the mobile device is also one.

In accordance with an example, an implicit one-to-one mapping can be defined as follows. A number of individual acknowledgement (ACK) resources available in an uplink resource block, m, can be equivalent to a number of cyclic-shift/orthogonal cover combinations in the uplink resource block. Given m, a PDCCH index, i, an uplink resource block index, b, and an ACK resource index, k, can be defined according to the following:

$$i = \{0, 1, \ldots, N_{PDCCH} - 1\}$$

$$b = \{0, 1, \ldots, \text{floor}(N_{PDCCH}/m)\}$$

$$k = \{0, 1, \ldots, m - 1\}$$

where $N_{PDCCH}$ represents a number of PDCCH instances. A mapping from a kth ACK resource of uplink resource block, b, to an ith PDCCH index can be determined via the following:

$$i = \begin{cases} b \cdot m + \text{floor}(k/2) + \frac{m}{2}((k+1)\bmod 2) & \text{for } m/3 \le k < 2m/3 \\ b \cdot m + \text{floor}(k/2) + \frac{m}{2}(k \bmod 2) & \text{else} \end{cases}$$

Pursuant to this mapping, a PDCCH index, i, can be determined given an uplink ACK resource location, (b, k).

In accordance with another example, a resource location, (b, k) can be ascertained given a PDCCH index, i. For instance, a resource block index, b, and an ACK resource index, k, can be determined according to the following relationship:

$$b = \lfloor i/m \rfloor$$

$$k = i - b \cdot m$$

In addition, according to another example, a particular orthogonal cover, w(n), and cyclic shift, a(n), for ACK resource index, k, can be ascertained as follows:

$$a(n) = p_j(k, n)$$

$$w(n) = r_j(k, n)$$

Pursuant to this example, j is a cell index, n is a LFDM symbol index corresponding to k, $p_j(k, n)$ represents a hopping pattern of cyclic shift for index k in cell j, and $r_j(k, n)$ represents a hopping pattern of orthogonal covers for index k in cell j.

In an aspect, the implicit mapping module 208 can employ a mapping as described above to identify a resource location to utilize for an acknowledgement indicator. For instance, consider an example with four ACK resources per resource block (e.g., m=4) and four PDCCH indices (e.g., $N_{PDCCH}=4$). UE 204 can receive control information on a lowest CCE overall (e.g., i=0). The implicit mapping module 208 can identify a first ACK resource (e.g., k=0) of a first uplink resource block (b=0) which is to be employed by UE 204 to signal an acknowledgement indicator of a corresponding downlink data transmission. It is to be appreciated that other mappings can be employed and the subject matter disclosed herein is not limited to the mapping examples described supra.

According to another aspect, an uplink resource block can be a mixed resource block and include allocations of resource elements to other uplink control signaling in addition to acknowledgement indicators. For instance, channel quality indicators (CQI) can be allocated to a same resource block as acknowledgement indicators. In one example, higher layers can assign resources of the mixed resource block for CQI and such CQI-assigned resources can correspond to resources previously available for ACK. The implicit mapping module 208 can prune the one-to-one mapping. The implicit mapping module 208 can update mapping entries that resolve to invalid resources wherein invalid resources are resource locations assigned for CQI or other control signaling. In an aspect, the implicit mapping module 208 updates mapping entries by redefining a mapping of a PDCCH index from an invalid resource to a valid resource. For example, the implicit mapping module 208 can assign a valid resource location to a particular PDCCH index.

In accordance with an example, the implicit mapping module 208 can iterate through PDCCH indices and update mappings as necessary in order to prune the implicit one-to-one mapping to accommodate mixed resource blocks. For instance, the implicit mapping module 208 can commence with a first PDCCH index (e.g., i=0) and an iteration value, n, that is configured to zero. The implicit mapping module 208 can employ a one-to-one mapping to identify a corresponding acknowledgement resource location. The corresponding acknowledgement resource location includes an uplink resource block index and an acknowledgement resource index within the uplink resource block index. If the identified uplink resource block index corresponds to a regular (e.g., non-mixed) resource block index, the acknowledgement resource location is valid. If the identified resource block index corresponds to a mixed resource block index, a determination is made as to whether the location is allocated for acknowledgment indicators. For instance, an orthogonal cover and cyclic shift corresponding to the identified acknowledgement resource index can be evaluated. The resource location is declared valid when the cyclic shift is less than a number of cyclic shifts reserved for acknowledgement indicators in the mixed resource block. Otherwise, the resource location is invalid.

When the identified resource location is valid, the location is assigned to the PDCCH index, i, employed during the iteration. In addition, the iteration value, n, is incremented. When the identified resource location is invalid, the implicit mapping module 208 employs the one-to-one mapping to discover a subsequent PDCCH index, i', where i' is greater than i, that maps to a valid resource location. The discovered valid resource location is assigned to the original PDCCH index, i, and the iteration value, n, is updated based upon an increment of the subsequent PDCCH index, i', employed to discover the valid resource location. The implicit mapping module 208 can repeat with a next PDCCH index (e.g., i+1) until all available acknowledgment resources are assigned to PDCCH indices.

According to another aspect, scheduler 206 can semi-persistently schedule UE 204. UE 204, when semi-persistently scheduled, obtains scheduling information that remains active for more than one TTI. For example, in LTE based systems, UE 204 can receive scheduling information specifying a resource allocation that is active for every nth TTI until notified otherwise. Accordingly, UE 204, when semi-persistently scheduled, receives downlink sub-frames that include PDSCH (e.g., user data) but not necessarily PDCCH (e.g., downlink control information). UE 204 receives user data (e.g., PDSCH) on the downlink. UE 204 signals an acknowledgment indicator (e.g, ACK or NAK) to base station 202 to inform whether or not the user data is successfully received and decoded. For example, UE 204 employs a physical uplink control channel (PUCCH) to signal the acknowledgement indicator. In addition, it is to be appreciated that UE 204 can utilize a physical uplink shared channel (PUSCH) for acknowledgement indicators. For instance, UE 204 can multiplex the acknowledgment indicator with user data transmitted on the uplink.

In an aspect, UE 204 includes a persistent mapping module 210 that identifies a resource location of PUCCH to utilize for the acknowledgement indicator. In one example, the persistent mapping module 210 can evaluate scheduling information to extract the resource location. Scheduler 206 can include an explicit allocation of acknowledgement resources when semi-persistently scheduling UE 204. Scheduler 206 can ensure that the explicitly allocated resource does not coincide with a resource implicitly mapped from a PDCCH index. For instance, scheduler 206 can refrain from utilizing PDCCH indices that correspond to acknowledgement resources explicitly allocated to semi-persistently scheduled users.

According to another example, the implicit mapping module 208 and the persistent mapping module 210 can interoperate to multiplex acknowledgement indicators from dynamically scheduled users and semi-persistent users so that collisions do not occur. A total set of available acknowledgement resources can be partitioned into two subsets, one for dynamically scheduled users and one for persistently scheduled users. The persistent mapping module 210 can identify resource locations that are explicitly allocated by scheduler 206 within the associated subset. In addition, the implicit mapping module 208 can further prune the one-to-one mapping to exclude acknowledgement resources in the semi-persistent subset. For instance, the implicit mapping module 208 can verify a resource location against the subsets and declare resource locations with the semi-persistent subset to be invalid. The implicit mapping module 208 can update invalid location(s) as described supra. Accordingly, in one example, the partitioning of acknowledgement resources is known to scheduler 206 alone, and scheduler 206 prevents collisions. In another example, UE 204 knows the partitioning scheme and further prunes an implicit one-to-one mapping to prevent collisions.

Moreover, although not shown, it is to be appreciated that base station 202 can include memory that retains instructions with respect to dynamically scheduling mobile devices, semi-persistently scheduling mobile devices, explicitly allocating acknowledgment resources to semi-persistently scheduled mobile devices, and the like. In addition, the memory can retain instructions related to partitioning acknowledgement resources on the uplink and scheduling dynamic and semi-persistent mobile devices to prevent acknowledgement collisions. Further, base station 202 can include a processor that may be utilized in connection with executing instructions (e.g., instructions retained within memory, instructions obtained from a disparate source, . . . ).

In addition, it is also to be appreciated that UE 204 can include memory that retains instructions with respect to implicitly mapping a downlink control channel index to an acknowledgement resource location, extracting an acknowledgement resource location from scheduling information, pruning a one-to-one map for mixed resource blocks, and the like. In addition, the memory can include instructions related to updating the one-to-one map to exclude acknowledgement resources intended for persistently scheduled mobile devices. Further, UE 204 can also include a processor that may be utilized in connection with executing instructions (e.g., instructions retained within memory, instructions obtained from a disparate source, . . . ).

Figure 3:
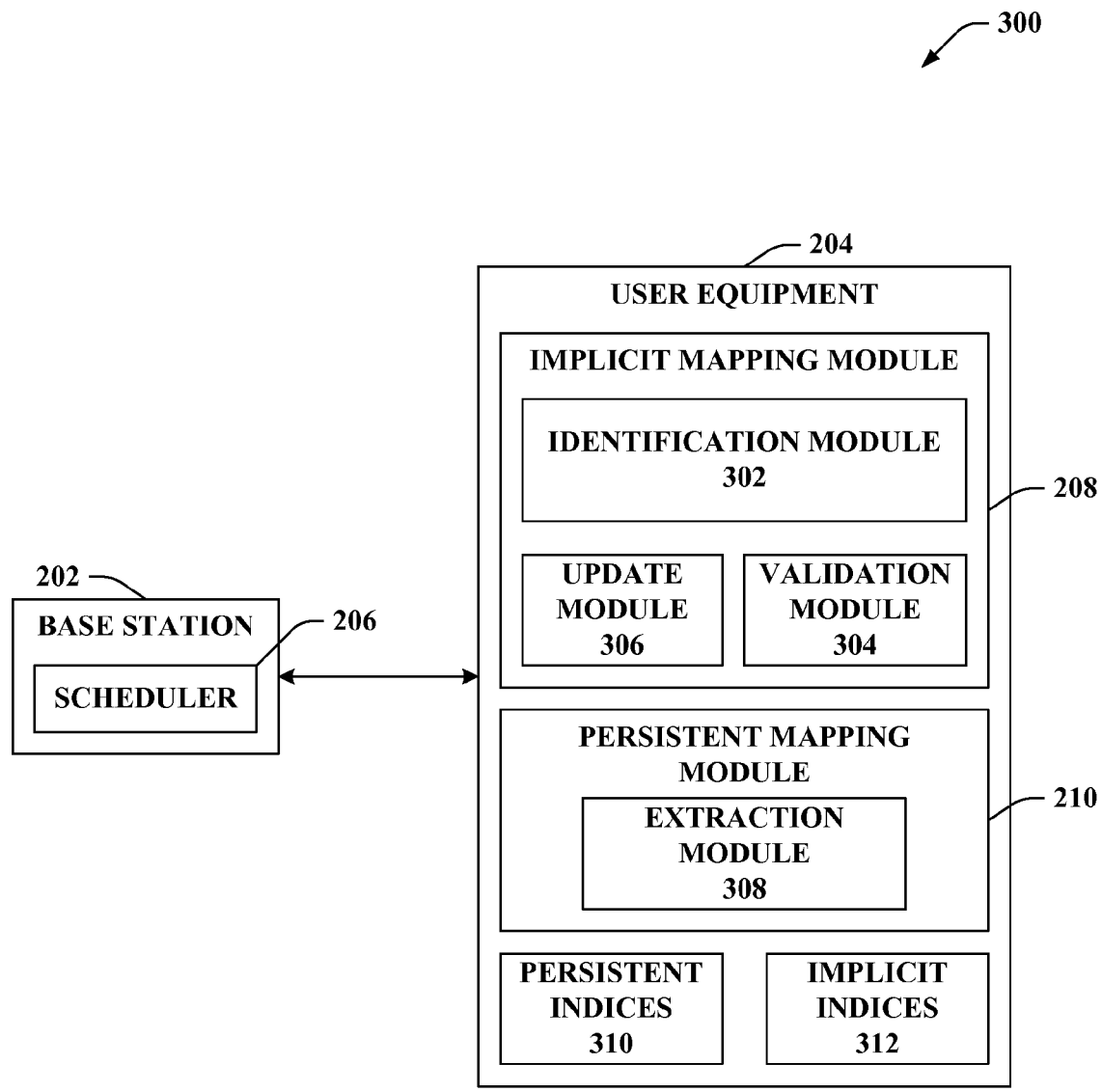
FIG. 3 is an illustration of an example wireless communications system that facilitates allocation of acknowledgement resources in a mixed resource block for dynamically and persistently scheduled devices.

FIG. 3 illustrates a wireless communication system 300 that facilitates allocation of acknowledgement resources in a mixed resource block for dynamically and semi-persistently scheduled devices. System 300 includes base station 202 that transmits information to user equipment (UE) 204 via a downlink. In addition, UE 204 can transmit information to base station 202 via an uplink. Similar to system 200, system 300 can be a MIMO system and/or an LTE-based communication system. Moreover, it is to be appreciated that base station 202 and UE 204 can be substantially similar to and/or provide similar functionality as base station 202 and UE 204 described above with reference to FIG. 2.

Base station 202 includes a scheduler 206 that can allocate downlink and uplink resources to UE 204 and/or other mobile devices (not shown) served by base station 202. For instance, schedule 206 can assign UE 204 one or more resource blocks on the downlink and one or more resource blocks on the uplink. In accordance with an aspect, scheduler 206 can dynamically schedule UE 204. When dynamically scheduled, UE 204 obtains scheduling information for each TTI. Scheduling information can be transmitted on a physical downlink control channel (PDCCH) and can be located in one or more control channel elements (CCEs). A lowest CCE index employed to construct PDCCH for a particular user can be utilized as a downlink PDCCH index. The downlink PDCCH index can be utilized to identify resources on the uplink to employ to signal an acknowledgement indicator (e.g., ACK or NAK).

UE 204 includes an implicit mapping module 208 that facilitates identification of acknowledgement resources on the uplink. The implicit mapping module 208 can employ a one-to-one mapping of PDCCH indices to acknowledgment resources on the uplink. For example, UE 204 can acknowledge a particular downlink transmission through utilization of the one-to-one mapping. The downlink transmission is allocated to resources according to scheduling information signaled on the PDCCH. The lowest CCE index utilized to construct the allocation is a PDCCH index that can be employed to identify an acknowledgement resource location on the uplink. According to an example, a one-to-one mapping mechanism, such as that described supra with respect to FIG. 2, can be utilized. It is to be appreciated that other one-to-one mapping mechanisms can be employed in connected with the disclosed subject matter.

Some resource blocks assigned to ULE 204 on the uplink can be mixed resource blocks. A mixed resource block includes other uplink control signaling in addition to acknowledgements. In mixed resource blocks, resource elements otherwise available for acknowledgement are assigned to other control information (e.g., CQI, etc.). The implicit mapping module 208 can prune the one-to-one mapping to avoid resources assigned to other control information. The implicit mapping module 208 includes an identification module 302 that determines an acknowledgement resource location based at least in part on a downlink index (e.g., PDCCH index). The identification module 302 employs an implicit one-to-one mapping between the downlink index and the resource location. For instance, the identification module 302 can utilize the implicit mapping mechanism described supra with reference to FIG. 2.

The implicit mapping module 208 can further include a validation module 304 that verifies a resource location. The validation module 304 can ascertain whether a resource location determined by the identification module 302 is an acknowledgement resource or a resource assigned for other control information. The validation module 304 can indicate whether the determined resource location is a valid resource (e.g., acknowledgement resource) or an invalid resource (e.g., assigned for other control information). In addition, the implicit mapping module 208 includes an update module 306 that can generate a new association between a resource location and a downlink index when the validation module 304 indicates the downlink index maps to an invalid location. According to an example, the update module 306 can discover a closest index that is greater than the downlink index but maps to a valid location. The update module 306 redefines the one-to-one mapping such that the downlink index is paired to the discovered valid location. In another aspect, the identification module 302, validation module 304, and update module 306 can iterate through each consecutive downlink index until each is assigned to a unique and valid resource location.

According to an aspect, scheduler 206 can semi-persistently schedule UE 204. For example, scheduler 206 can allocate one or more resource blocks to UE 204 wherein the allocation is valid for more than one TTI. With semi-persistently scheduled devices, a downlink user data transmission (e.g., a transmission on a physical downlink shared channel (PDSCH)) is not always accompanied by a PDCCH transmission. Thus, an implicit one-to-one mapping is not employed since downlink transmissions may not be associated with a corresponding PDCCH index. Scheduler 206 can include uplink resource locations in scheduling information for semi-persistent users. Accordingly, UE 204 can include a persistent mapping module 310 that identifies an uplink resource location to utilize to signal an acknowledgement to base station 202. The persistent mapping module 310 can include an extraction module 308 that analyzes scheduling information generated by the scheduler 206. The extraction module 308 can identify an explicit resource location included in the scheduling information. In addition, the extraction module 308 can derive the resource location from other values in the scheduling information.

The implicit mapping module 208 and the persistent mapping module 210 can interoperate to avoid resource collisions. For example, a collision can occur when two disparate mobile devices attempt to utilize a single resource simultaneously. For instance, a dynamically scheduled device can be implicitly mapped to a resource location explicitly assigned to a persistently scheduled device. In addition, a mobile device (e.g., UE 204) can be dynamically scheduled in certain sub-frames and persistently scheduled in others.

To avoid conflicts, UE 204 can segment resources to employ for acknowledgements wherein one segment is for dynamically scheduled users and another segment is for persistently scheduled users. A set of total available acknowledgement resources can be partitioned into two subsets. UE 204 can retain a set of persistent indices 310 that includes indices of acknowledgement resources in one subset that are assigned for utilization by persistently scheduled users. UE 204 can also retain a set of implicit indices 312 that includes resource indices in a second subset assigned for utilization by dynamically scheduled users.

The persistent mapping module 210 identifies resource locations included in the persistent indices 310. In addition, the implicit mapping module 208 can further prune the one-to-one mapping to remove entries associated with indices included in the persistent indices 310. The validation component 304 can indicate a resource location as invalid when it is included in the persistent indices 310, and the update module 306 can assign a new mapping.

Figure 4:
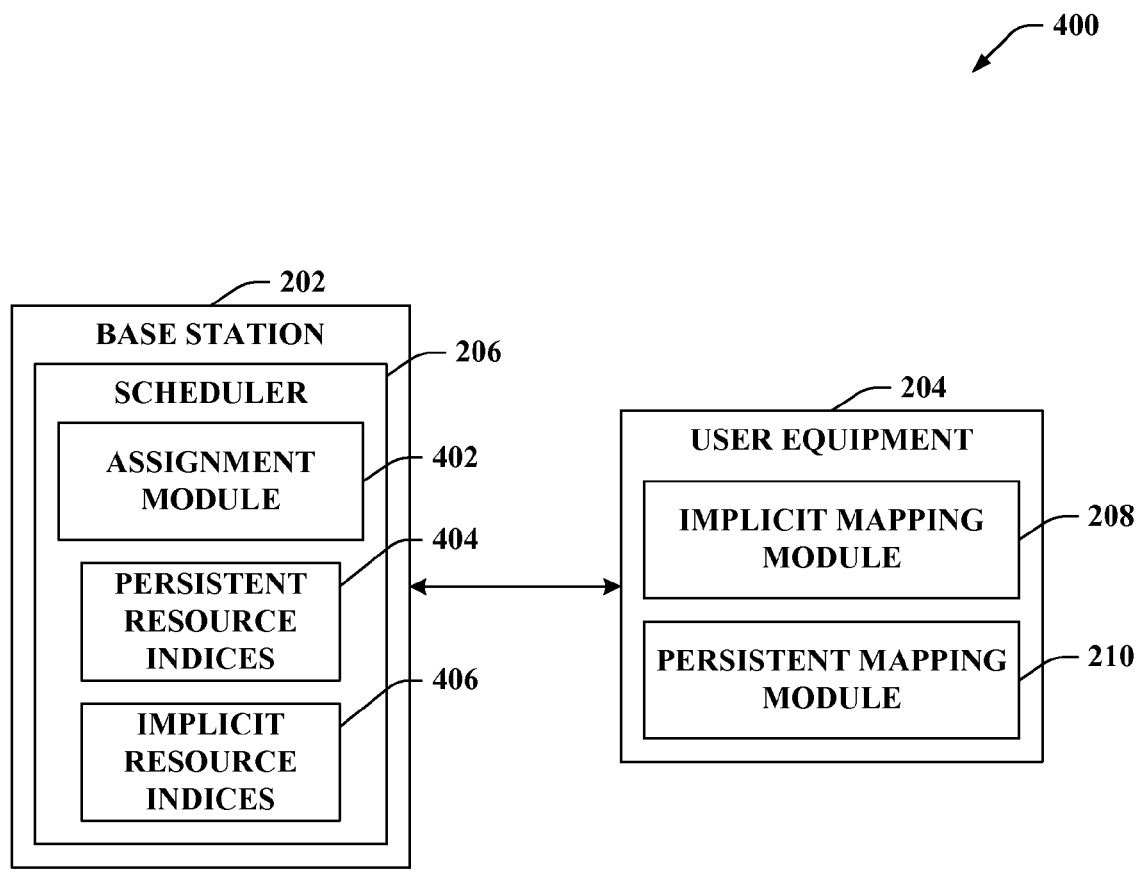
FIG. 4 is an illustration of an example system that facilitates assignment of acknowledgement resources for persistently scheduled devices in the presence of dynamically scheduled devices.

Referring now to FIG. 4, a communication system 400 is depicted. System 400 facilitates assignment of acknowledgement resources for persistently scheduled devices in the presence of dynamically scheduled devices. System 400 includes a base station 202, UE 204, scheduler 206, implicit mapping module 208, and persistent mapping module 210 as described in further detail supra.

In an aspect, scheduler 206 can include an assignment module 402 that selects a resource allocation for UE 204. Scheduler 206 can dynamically schedule UE 204 and provide scheduling information for each TTI. The scheduling information can be transmitted on a downlink control channel wherein the control channel information for UE 204 is associated with a downlink index. The implicit mapping module 208 employs the downlink index to link, implicitly, to an uplink resource location. The uplink resource location is utilized to signal acknowledgement indicators. Scheduler 206 can also persistently schedule UE 204. When persistently scheduled, UE 204 obtains scheduling information that remains valid for more than one TTI. In addition, assignment module 402 can explicitly allocate uplink resources to UE 204 for acknowledgements.

According to an aspect, the assignment module 402 can allocate resources among mobile devices (e.g., UE 204 and other disparate devices) to avoid collisions among acknowledgement resources. For instance, scheduler 206 can retain information regarding resources assigned to persistently scheduled users and resources assigned implicitly to dynamically scheduled users. Scheduler 206 can retain a set of persistent resource indices 404 and a set of implicit resource indices 406. To evade acknowledgement collisions, the assignment module 402 can avoid utilizing downlink channel indices that implicitly link to resources explicitly assigned to persistently scheduled users. Alternatively and/or concurrently, the assignment module 402 can refrain from explicitly assigning resource locations that are implicitly mapped to by active, dynamically scheduled users.

Figure 5:
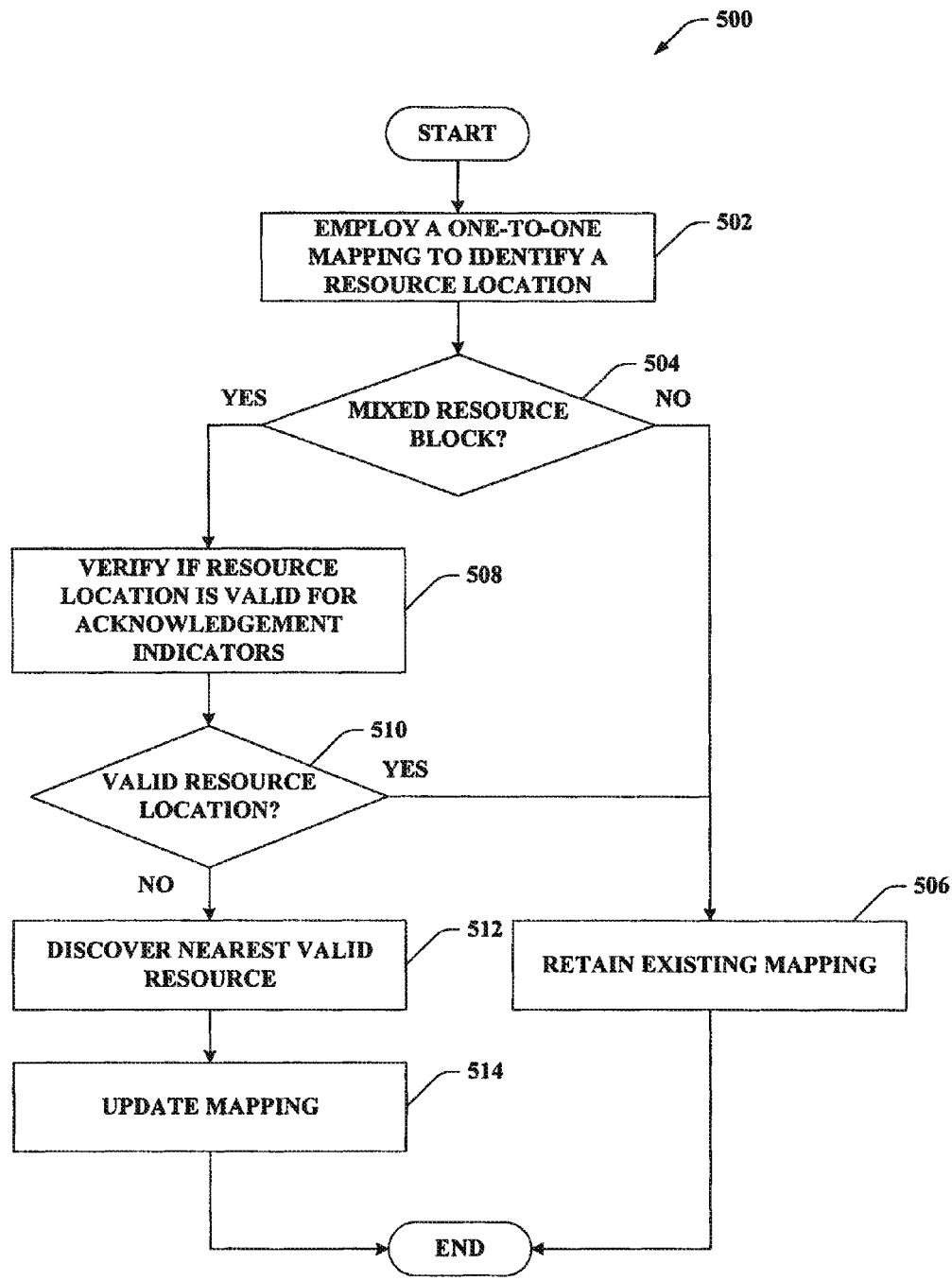
FIG. 5 is an illustration of an example methodology that facilitates identifying uplink acknowledgement resources based upon an implicit one to one mapping.
Figure 6:
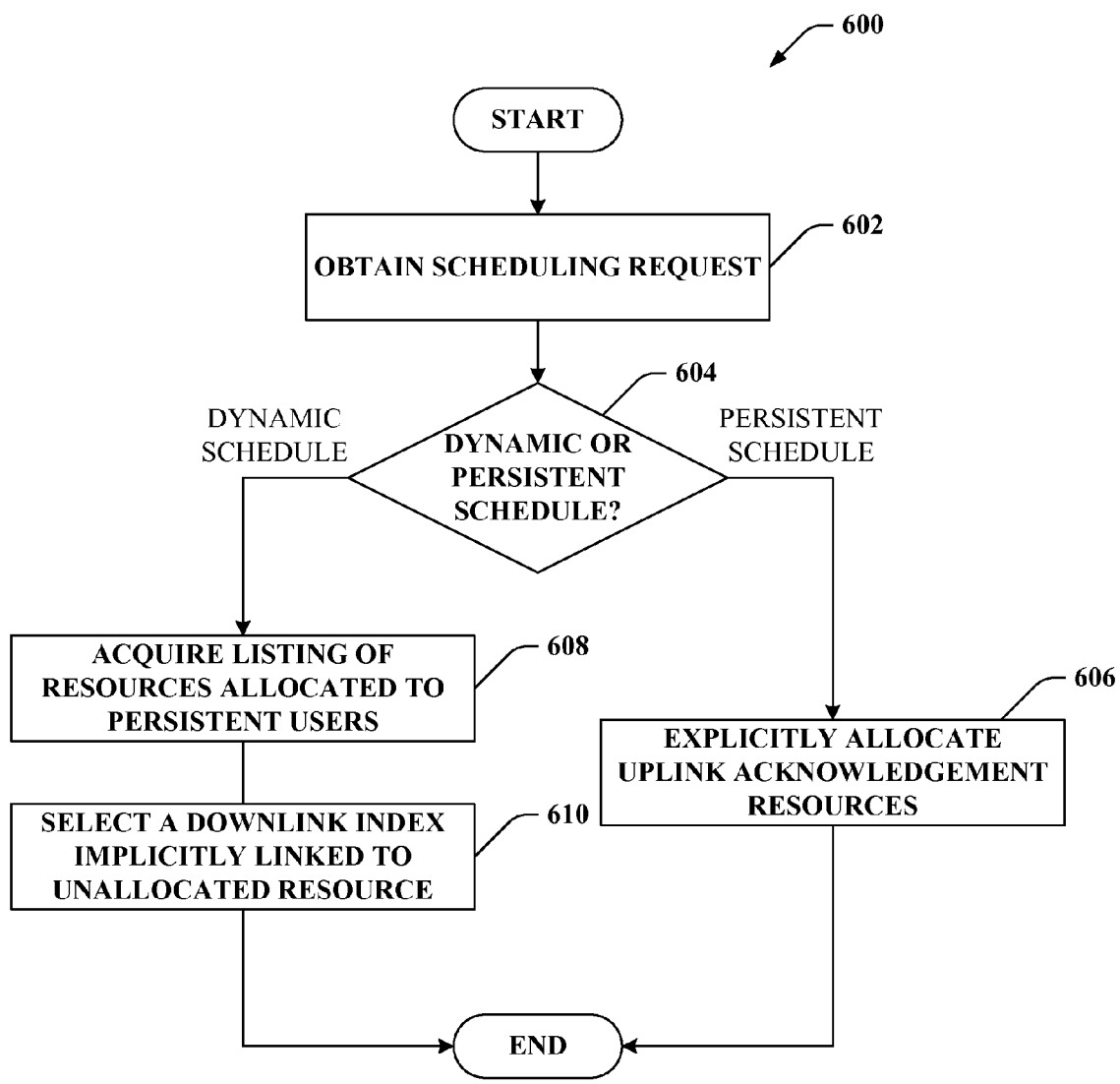
FIG. 6 is an illustration of an example methodology that facilitates implicit and/or explicit allocation of uplink acknowledgment resources.

Referring to FIGS. 5-6, methodologies relating to uplink acknowledgement resource allocation are described. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a method 500 that facilitates identifying uplink acknowledgement resources based upon an implicit one-to-one mapping. Method 500 can be employed by, for example, a mobile device to select resources on an uplink control channel for acknowledgement indicators. The selection can be based in part on a downlink channel index utilized to convey scheduling information.

In an aspect, method 500 can commence at reference numeral 502 where a one-to-one mapping can be utilized to identify a resource location on an uplink control channel. For instance, a one-to-one mapping similar to the mechanism described above with reference to FIG. 2 can be utilized. The one-to-one mapping links a downlink channel index to a resource location on the uplink control channel. The downlink channel index can be, for example, an index of a lowest control channel element utilized to construct a downlink control channel that includes scheduling information of a downlink user data transmission.

At reference numeral 504, a decision is made as to whether the resource location is contained within a mixed resource block. A mixed resource block is a resource block that includes resource elements assigned to other control information in addition to acknowledgement indicators. If the resource location is not within a mixed resource block, method 500 proceeds to reference numeral 506 where the resource location is deemed valid and the mapping between the resource block and the downlink channel index is maintained. If the resource location is within a mixed resource block, method 500 proceeds to reference numeral 508. At 508, the resource location is evaluated to verify whether the resource location is valid for acknowledgement indicators. A determination is made at reference numeral 510 as to whether the resource location is valid. If yes, method 500 proceeds to reference numeral 506 and the mapping is retained. If the resource location is invalid (e.g., assigned for other control information), method 500 proceeds to reference numeral 512 where a nearest valid resource is discovered. For example, a downlink index greater than the index employed at reference numeral 502 in connection with the one-to-one mapping can be discovered such that the newly discovered index is associated with a valid resource. Once a valid resource is discovered, the one-to-one mapping can be updated at reference numeral 514. For example, the mapping can be redefined so that the first index employed at reference numeral 502 links to the valid resource discovered at reference numeral 512.

In an aspect, method 500 can be iterated until all valid acknowledgement resources are linked to downlink channel indices. It is to be appreciated that downlink channel indices that previously linked to valid resources, but are pre-empted by lower ranking indices, can be remapped to unique resources through method 500.

Referring to FIG. 6, illustrated is a method 600 that facilitates implicit and/or explicit allocation of uplink acknowledgment resources. Method 600 can be employed by, for example, a base station to allocate uplink acknowledgement resources to dynamically scheduled and persistently scheduled mobile devices without collisions. Method 600 can commence at reference numeral 602 where a scheduling request can be obtained. The scheduling request can be transmitted by a mobile device, for example. At reference numeral 604, a determination is made as to whether the mobile device from which the scheduling request was obtained is to be dynamically or persistently scheduled. If the mobile device is persistently scheduled, uplink acknowledgement resources are explicitly allocated. For instance, the explicit allocation can be included in scheduling information. If, at reference numeral 604, a determination is made that the mobile device is to be dynamically scheduled, method 600 proceeds to reference numeral 608. At 608, a listing of resources explicitly allocated to persistent users is acquired. At reference numeral 610, a downlink index is selected that is implicitly linked to unallocated resources. For instance, when constructing a downlink control channel to carry scheduling information, a downlink index is employed that does not implicitly link to resources explicitly allocated to persistent users.

It will be appreciated that, in accordance with one or more aspects described herein, inferences can be made regarding implicitly linking downlink control channel indices to acknowledgement resource locations, identifying invalid resource locations, selecting nearest valid resources, updating a one-to-one mapping, pruning a mapping to remove entries associated with persistent users, scheduling dynamic users such that collisions with persistent users are avoided, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
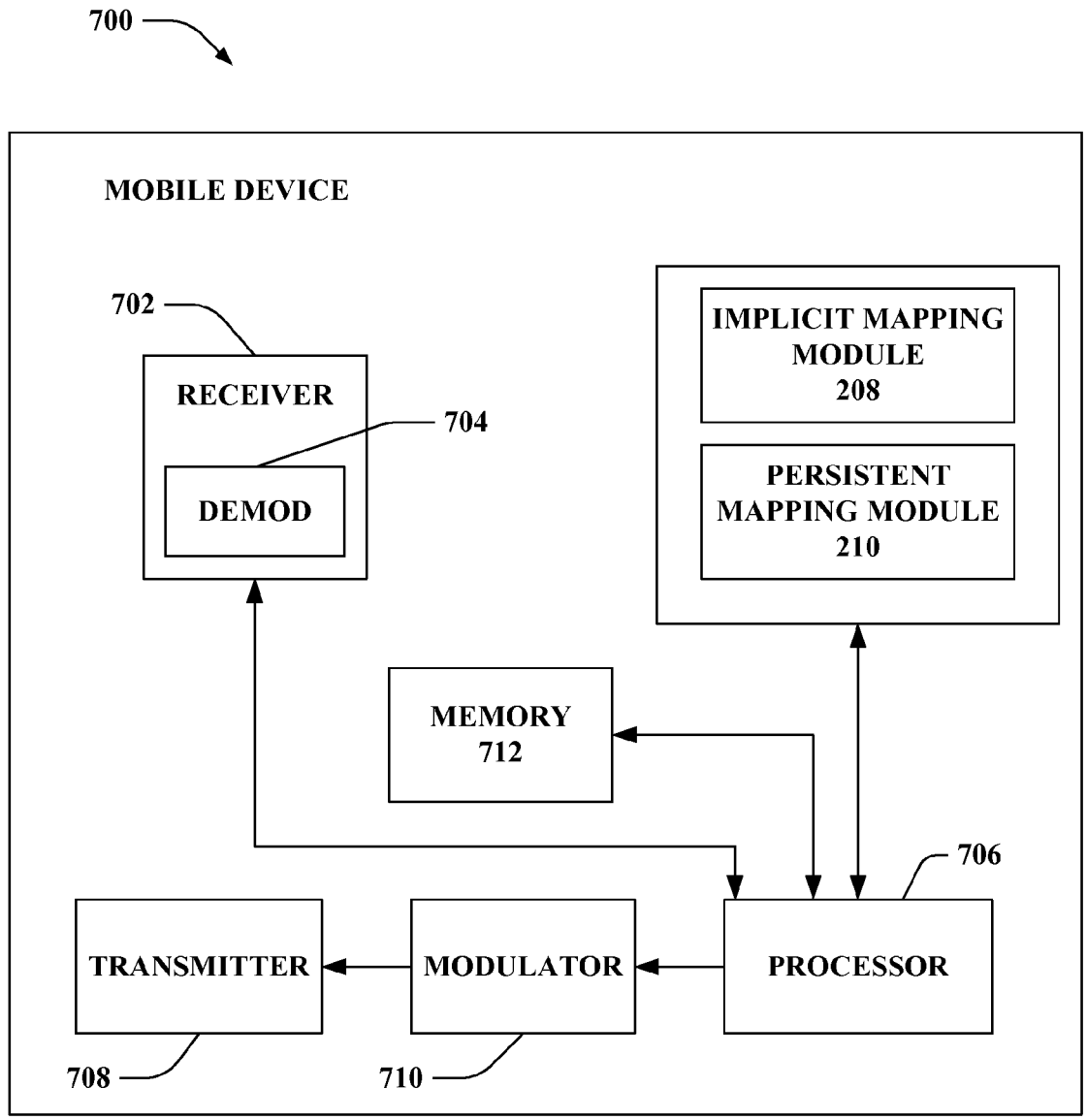
FIG. 7 is an illustration of an example system that facilitates identifying uplink acknowledgement resources via a mapping.

FIG. 7 is an illustration of a mobile device 700 that can effectuate communications associated with a mobile device in a wireless communication system in accordance with an aspect of the disclosed subject matter. Mobile device 700 can facilitate identifying uplink acknowledgement resources via mapping. It is to be appreciated that the mobile device 700 can be the same or similar as, and/or can comprise the same or similar functionality as, mobile device 116, or user equipment 204, such as more described herein, for example, with regard to system 100, system 200, system 300, system 400, methodology 500, and methodology 600.

Mobile device 700 can comprise a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 708, a processor that controls one or more components of mobile device 700, and/or a processor that analyzes information received by receiver 702, generates information for transmission by transmitter 708, and controls one or more components of mobile device 700. Mobile device 700 can also comprise a modulator 710 that can work in conjunction with the transmitter 708 to facilitate transmitting signals (e.g., data, acknowledgement indicators, etc.) to, for instance, a base station (e.g., 102, 202), another mobile device (e.g., 122), etc. For example, transmitter 708 can be employed to transmit acknowledgment indicators (e.g., ACK or NAK) to a base station at uplink resources explicitly allocated by the base station or identified via an implicit mapping.

In one aspect, the processor 706 can be connected to an implicit mapping module 208 which employs a one-to-one mapping to identify a resource location of an uplink control channel (e.g., PUCCH) to utilize for an acknowledgement indicator. The one-to-one mapping links a downlink control channel index (e.g., PDCCH index) to an acknowledgement resource location. In one example, a one-to-one mapping such as the mapping described above with reference to FIG. 2 can be employed. The implicit mapping module 208 can update the one-to-one mapping to remove default entries that link downlink channel indices to invalid resources in mixed resource blocks. In another aspect, the processor 706 can be connected to a persistent mapping module 210 that identifies a resource location explicitly allocated. For example, the persistent mapping module 210 can evaluate scheduling information to extract the resource location. In an aspect, the implicit mapping module 208 can further redefine the one-to-one mapping to eliminate entries to resources explicitly allocated to persistently scheduled users.

Mobile device 700 can additionally comprise memory 712 that is operatively coupled to processor 706 and can store data to be transmitted, received data, information related to available channels, data associated with analyzed signal and/or interference strength, information related to an assigned channel, power, rate, or the like, and any other suitable information for estimating a channel and communicating via the channel. Memory 712 can additionally store protocols and/or algorithms associated with estimating and/or utilizing a channel (e.g., performance based, capacity based, etc.). It will be appreciated that the data store (e.g., memory 712) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 712 of the subject systems and methods is intended to comprise, without being limited to, these and any other suitable types of memory.

It is to be appreciated and understood that the implicit mapping module 208, persistent mapping module 210, and memory 712 each can be the same or similar as, or can comprise the same or similar functionality as, respective components such as those more fully described herein, for example, with regard to system 200, system 300, and system 400. It is to be further appreciated and understood that the implicit mapping module 208, persistent mapping module 210, and memory 712 each can be a stand-alone unit (as depicted), can be included within the processor 706, can be incorporated within another component, and/or virtually any suitable combination thereof, as desired.

Figure 8:
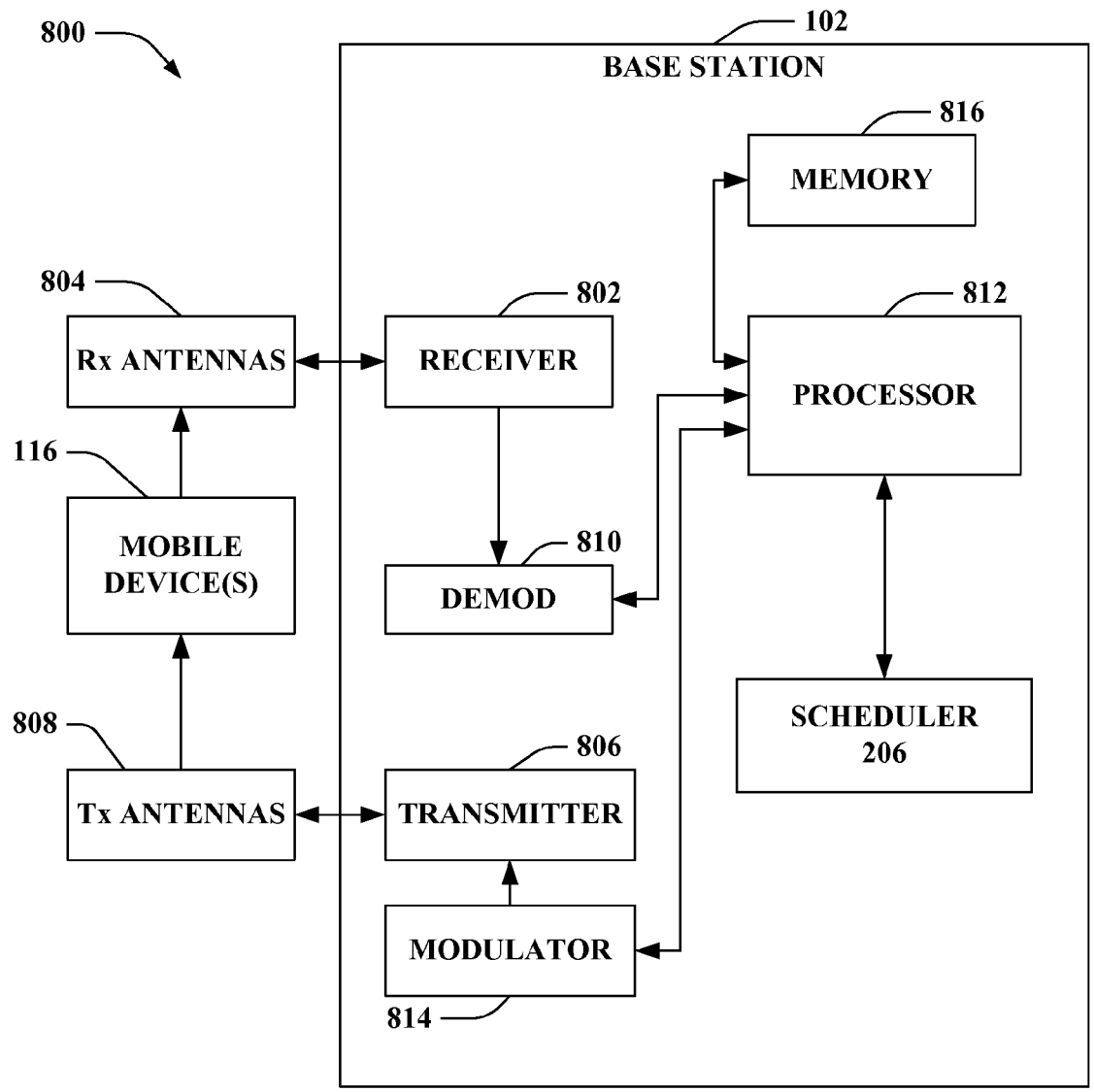
FIG. 8 is an illustration of an example system that facilitates allocation of uplink acknowledgement resources to dynamically scheduled and persistently scheduled mobile devices.

FIG. 8 is an illustration of a system 800 that can facilitate communications associated with a mobile device in a wireless communication system in accordance with an aspect of the disclosed subject matter. System 800 can comprise a base station 102 (e.g., access point, . . . ). The base station 102 can include a receiver 802 that can receive signal(s) from one or more mobile devices 116 through a plurality of receive antennas 804, and a transmitter 806 that can transmit signals (e.g., data) to the one or more mobile devices 116 through a transmit antenna 808. Receiver 802 can receive information from receive antennas 804 and can be operatively associated with a demodulator 810 that can demodulate received information. Demodulated symbols can be analyzed by a processor 812 that can be a processor dedicated to analyzing information received by receiver 802 and/or generating information for transmission by a transmitter 806, a processor that controls one or more components of base station 102, and/or a processor that analyzes information received by receiver 802, generates information for transmission by transmitter 806, and controls one or more components of base station 102. The base station 102 can also comprise a modulator 814 that can work in conjunction with the transmitter 806 to facilitate transmitting signals (e.g., data) to, for instance, a mobile devices 116, another device, etc.

Processor 812 can be connected with a scheduler 206 that can allocate downlink and uplink resources to mobile devices 116. For instance, scheduler 206 can assign mobile devices 116 one or more resource blocks on the downlink and one or more resource blocks on the uplink. In accordance with an aspect, scheduler 206 can dynamically schedule mobile device 116. When dynamically scheduled, mobile devices 116 obtain scheduling information for each TTI. According to another aspect, scheduler 206 can semi-persistently schedule mobile devices 116. For example, scheduler 206 can allocate one or more resource blocks to mobile devices 116 wherein the allocation is valid for more than one TTI. Scheduler 206 can include an explicit allocation of acknowledgement resources when semi-persistently scheduling mobile devices 116. Scheduler 206 can ensure that the explicitly allocated resources do not coincide with resources implicitly mapped from a downlink control channel index. For instance, scheduler 206 can refrain from utilizing downlink control channel indices that correspond to acknowledgement resources explicitly allocated to semi-persistently scheduled users.

Base station 102 can additionally comprise memory 816 that is operatively coupled to processor 812 and can store data to be transmitted, received data, information related to available channels, data associated with analyzed signal and/or interference strength, information related to an assigned channel, power, rate, or the like, and any other suitable information for estimating a channel and communicating via the channel. Memory 816 can additionally store protocols and/or algorithms associated with estimating and/or utilizing a channel (e.g., performance based, capacity based, etc.).

It will be appreciated that the memory 816 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 816 of the subject systems and methods is intended to comprise, without being limited to, these and any other suitable types of memory.

It is to be appreciated and understood that the scheduler 206 and memory 816 each can be the same or similar as, or can comprise the same or similar functionality as, respective components such as more fully described herein, for example, with regard to system 200, system 300, and system 400. It is to be further appreciated and understood that the scheduler 206 and memory 816 each can be a stand-alone unit (as depicted), can be included within the processor 812, and can be incorporated within another component and/or virtually any suitable combination thereof, as desired.

Figure 9:
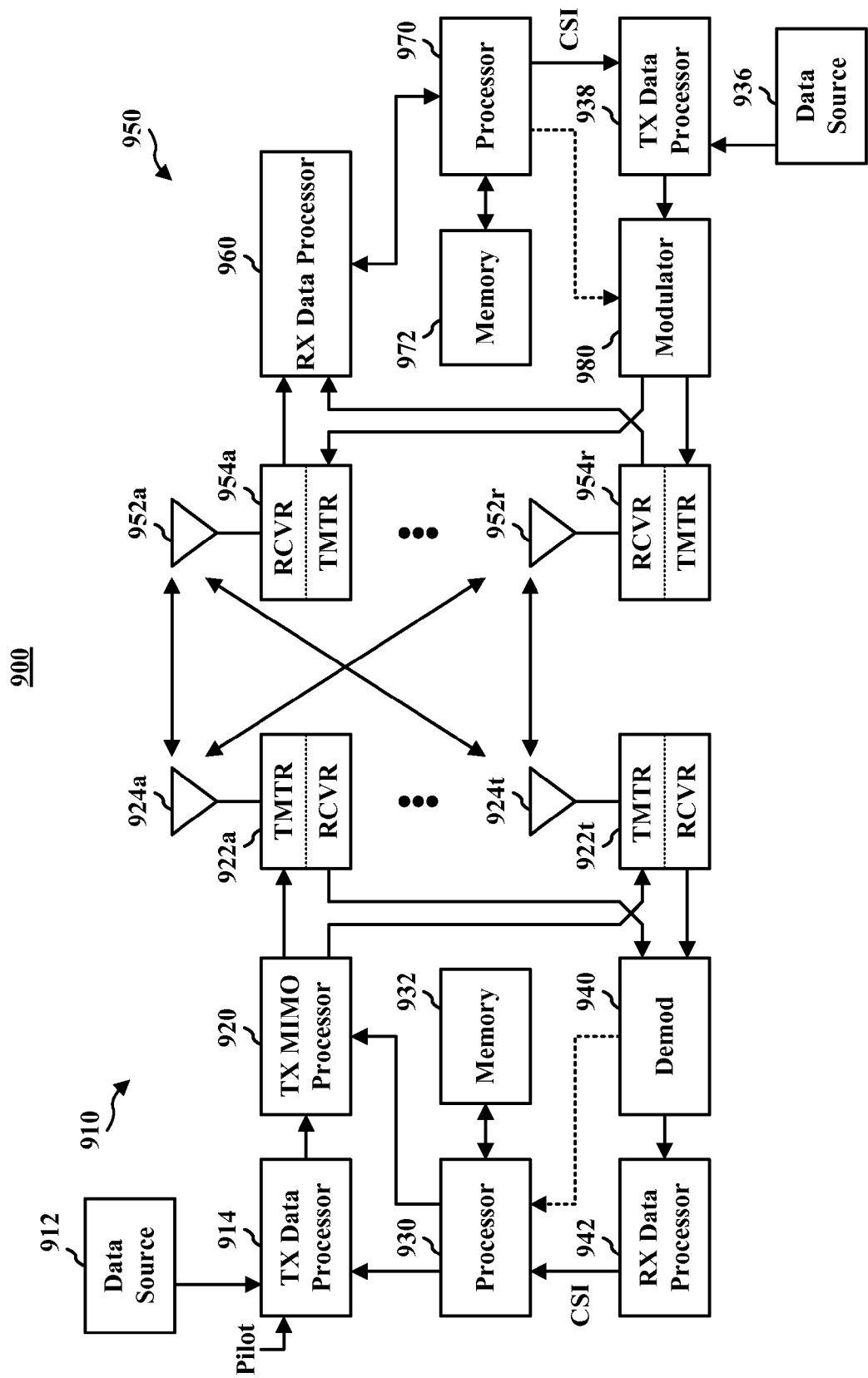
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1, 2, 3, 4 and 7-8) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
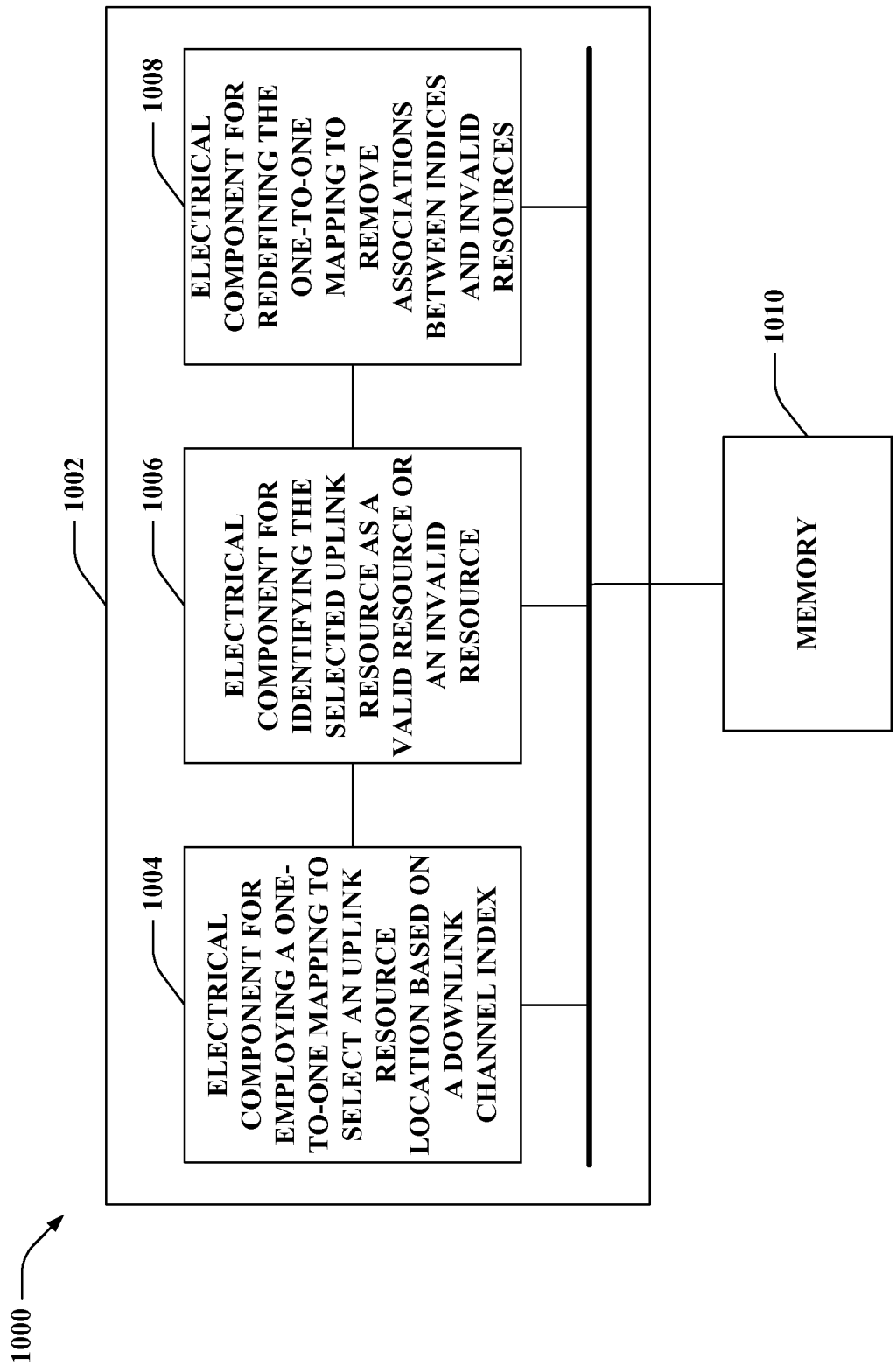
FIG. 10 is an illustration of an example system that enables identification of uplink acknowledgement resources.

With reference to FIG. 10, illustrated is a system 1000 that enables identification of uplink acknowledgement resources. For example, system 1000 can reside, at least partially, in a mobile device. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for employing a one-to-one mapping to select an uplink resource location based on a downlink channel index 1004. Further, logical grouping 1002 can comprise an electrical component for identifying the selected uplink resource as a valid resource or an invalid resource 1006. Moreover, logical grouping 1002 can comprise an electrical component for redefining the one-to-one mapping to remove associations between indices and invalid resources 1008. Additionally, system 1000 can include a memory 1010 that retains instructions for executing functions associated with electrical components 1004, 1006, and 1008. While shown as being external to memory 1010 it is to be understood that one or more of electrical components 1004, 1006, and 1008 can exist within memory 1010.

Figure 11:
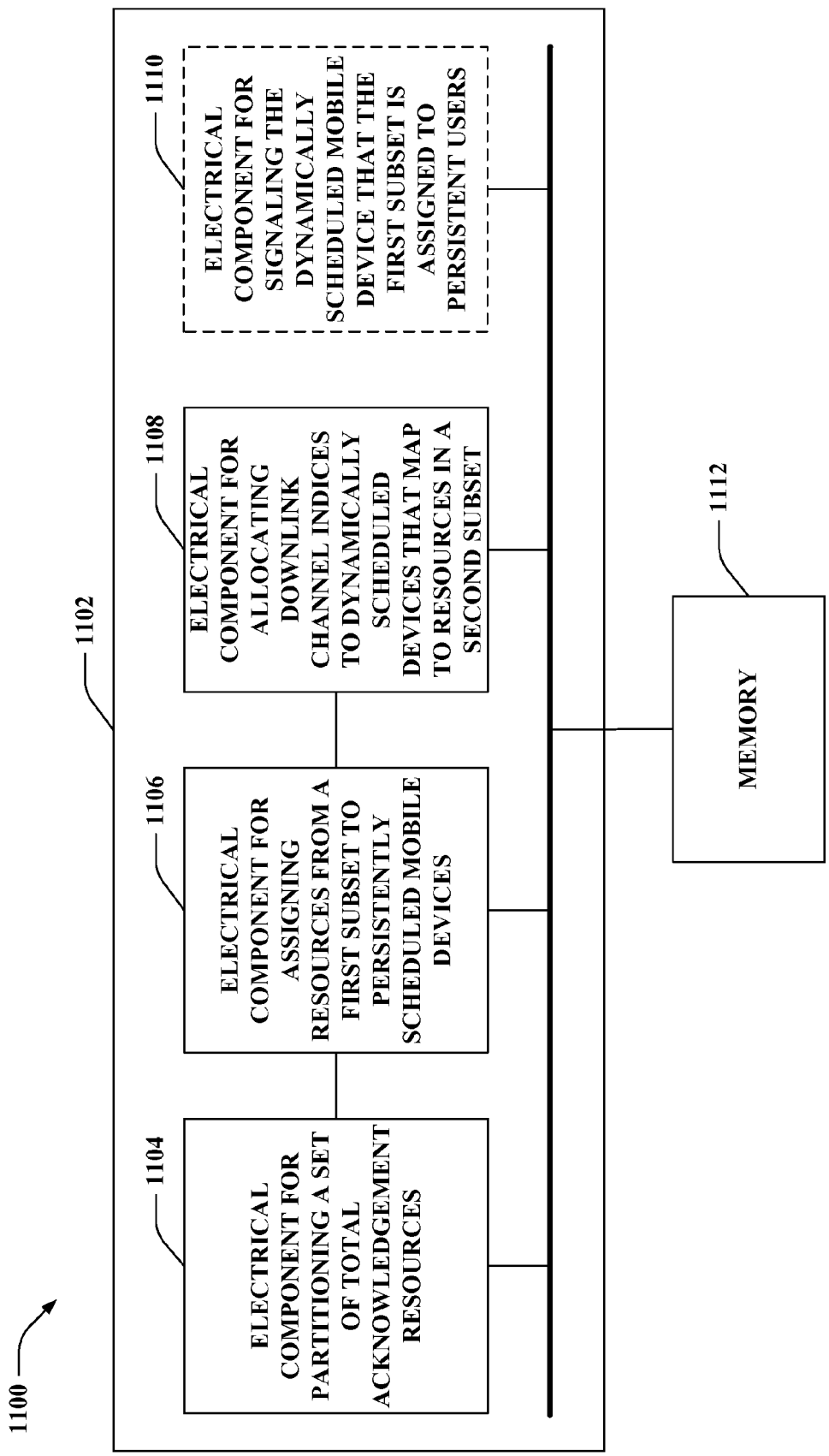
FIG. 11 is an illustration of an example system that facilitates allocation of uplink resources to one or more mobile devices.

With reference to FIG. 11, illustrated is a system 1100 that facilitates allocation of uplink resources to one or more mobile devices. For example, system 1100 can reside at least partially within a base station. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for partitioning a set of total acknowledgement resources 1104. Further, logical grouping 1102 can comprise an electrical component for assigning resources from a first subset to persistently scheduled mobile devices 1106. Moreover, logical grouping 1102 can comprise an electrical component for allocating downlink channel indices to dynamically scheduled devices that map to resources in a second subset 1108. Logical grouping 1102 can also optionally include an electrical component for signaling the dynamically scheduled mobile device that the first subset is assigned to persistent users 1110. Additionally, system 1100 can include a memory 1112 that retains instructions for executing functions associated with electrical components 1104, 1106, 1108 and 1110. While shown as being external to memory 1112, it is to be understood that one or more of electrical components 1104, 1106, 1108 and 1110 can exist within memory 1112.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates allocation of acknowledgement resources, the method comprising:
   utilizing a mapping to identify a first uplink resource location corresponding to a first downlink control channel index;
   evaluating with a processor the first uplink resource location to ascertain a validity of the first uplink resource location; and
   updating the mapping to assign a second uplink resource location corresponding to a second downlink control channel index to the first downlink control index when the first uplink resource location is invalid, the second downlink control channel index corresponding to a valid resource location.

2. The method of claim 1, wherein evaluating the first uplink resource location comprises identifying when a mixed resource block includes the first uplink resource location.

3. The method of claim 2, further comprising verifying that the first uplink resource location included in the mixed resource block is within a predetermined number of resource locations available in the mixed resource block.

4. The method of claim 3, further comprising indicating the first uplink resource location is an invalid location when the first uplink resource location is greater than the predetermined number of available resource locations.

5. The method of claim 3, further comprising indicating the first uplink resource location is a valid location when the first uplink resource location is within the predetermined number of resource locations.

6. The method of claim 1, wherein the second downlink control channel index is greater than the first downlink control channel index.

7. The method of claim 1, wherein evaluating the first uplink resource location comprises ascertaining whether the first uplink resource location is part of a set of resources allocated to persistently-scheduled mobile devices.

8. A wireless communications apparatus that facilitates implicit resource allocation, comprising:
   means for employing a one-to-one mapping between downlink indices and uplink resources to select a first uplink resource location corresponding to a first downlink control channel index;
   means for determining a validity of the first uplink resource location; and
   means for redefining the one-to-one mapping to assign a second uplink resource location corresponding to a second downlink control channel index to the first downlink control index when the first uplink resource location is invalid, the second downlink control channel index corresponding to a valid resource location.

9. The wireless communications apparatus of claim 8, wherein the first uplink resource location is an invalid resource location when the first uplink resource location is greater than a set of predetermined acknowledgement resources in a mixed resource block.

10. The wireless communications apparatus of claim 8, wherein the first uplink resource location is an invalid resource when the first uplink resource location is within a set of acknowledgement resources assigned for utilization by semi-persistently scheduled mobile devices.

* * * * *